United States Patent [19]

Giraudon

[11] 3,855,272
[45] Dec. 17, 1974

[54] 1-ALKOXYCARBONYL-2-ALKYLCARBAMOYLMETHYL-3-(2-ACYLAMIDO-PHENYL)ISOTHIOUREA

[75] Inventor: Raymond Giraudon, Seine-et-Marne, France

[73] Assignee: Rhone-Poulenc, S.A., Paris, France

[22] Filed: May 29, 1973

[21] Appl. No.: 364,333

[30] Foreign Application Priority Data
May 30, 1972 France .................. 72.19321

[52] U.S. Cl. ........................... 260/470, 424/309
[51] Int. Cl. .................................. C07c 157/14
[58] Field of Search ........................ 260/470

[56] References Cited
UNITED STATES PATENTS

| | | | |
|---|---|---|---|
| 3,763,219 | 10/1973 | Widdig et al. ............... | 260/470 |
| 3,766,243 | 10/1973 | Widdig et al. ............... | 260/470 |
| 3,711,504 | 1/1973 | Adams et al. ................ | 260/470 |

OTHER PUBLICATIONS

March "Advanced Organic Chemistry," McGraw–Hill, (1968), N.Y. pages 589, 590.

Primary Examiner—James A. Patten
Assistant Examiner—John F. Terapane
Attorney, Agent, or Firm—Stevens, Davis, Miller & Mosher

[57] ABSTRACT

Isothiourea derivatives of the formula:

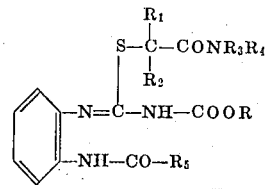

wherein R represents lower alkyl, $R_1$, $R_2$, $R_3$ and $R_4$ represent hydrogen, lower alkyl, lower alkenyl or lower alkynyl, and $R_5$ represents hydrogen, lower alkyl, lower alkenyl or lower alkynyl, or phenyl optionally carrying one to five substituents selected from halogen, and lower alkyl and lower alkoxy, are new compounds possessing fungicidal properties.

6 Claims, No Drawings

1-ALKOXYCARBONYL-2-ALKYLCARBAMOYLMETHYL-3-(2-ACYLAMIDOPHENYL)ISOTHIOUREA

This invention relates to new isothioureas, to a process for their preparation and to compositions containing them.

The new isothioureas of the present invention are those of the general formula:

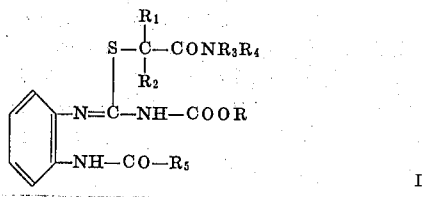

I wherein R represents a lower alkyl radical, $R_1$, $R_2$, $R_3$ and $R_4$ have the same or different significances and each represents a hydrogen atom or a lower alkyl, lower alkenyl or lower alkynyl radical, and $R_5$ represents a hydrogen atom or a lower alkyl, lower alkenyl or lower alkynyl radical, or a phenyl radical optionally carrying 1 to 5 substituents, which — when two or more are present — may be the same or different, selected from halogen atoms and lower alkyl and lower alkoxy radicals. In this specification the qualification "lower" as applied to alkyl and alkoxy radicals means that the radical contains 1 to 4 carbon atoms, and the qualification lower as applied to alkenyl and alkynyl radicals means that the radical contains 2 to 4 carbon atoms.

According to a feature of the invention, the new isothiourea derivatives of general formula (I) are prepared by reacting a halogenated amide of the general formula:

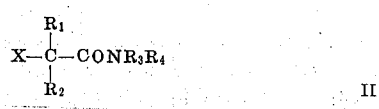

II (wherein $R_1$, $R_2$, $R_3$, and $R_4$ are as hereinbefore defined, and X represents a halogen, preferably bromine or chlorine, atom) with a phenylthiourea of the general formula:

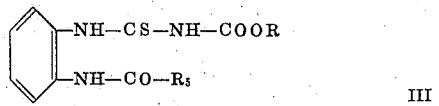

III wherein R and $R_5$ are as hereinbefore defined.

The reaction is generally carried out in an inert organic solvent, for example aceton, acetonitrile or dimethylformamide, in the presence of an alkaline condensation agent such as potassium carbonate. When X in the amide reactant represents a chlorine atom, the reaction is preferably effected in the presence of an alkali metal iodide.

The phenylthioureas of general formula III can be prepared by a procedure described in British Patent Specification No. 1,312,743; the application was filed by Rhone-Poulenc S. A. on July 16, 1971.

The isothiourea derivatives of general formula I possess useful fungicidal properties; they have particularly interesting contact action against cucumber mildew (*Erysiphe cichoracearum*), apple mildew (*Podosphaera leucotricha*), bean anthracnose (*Colletotrichum lindemuthianum*) and wheat rust (*Puccinia glumarum*) when applied at quantities between 10 and 50 g. per hectolitre of liquid diluent. They furthermore have the advantage of being systemic, in particular when they are applied by sprinkling soil with liquid compositions containing them, against bean anthracnose and against cucumber mildew at quantities greater than or equal to 0.1 g. per hectolitre of liquid diluent.

The preferred compounds of general formula I are those wherein R represents a methyl radical, $R_1$ and $R_2$ each represent a hydrogen atom, $R_3$ represents a hydrogen atom, $R_4$ represents a lower alkyl radical and $R_5$ represents a hydrogen atom or a lower alkyl or phenyl radical, and more particularly those such compounds wherein $R_4$ represents a methyl radical and $R_5$ represents a hydrogen atom or a methyl or phenyl radical, for example 1-methoxycarbonyl-2-methylcarbamoylmethyl-3-(2-acetamidophenyl)-isothiourea, 1-methoxycarbonyl-2-methylcarbamoylmethyl-3-(2-benzamidophenyl)-isothiourea and 1-methoxycarbonyl-2-methylcarbamoylmethyl-3-(2-formamidophenyl)-isothiourea.

According to a further feature of the present invention, there are provided fungicidal compositions which contain, as the active ingredient, at least one isothiourea derivative of general formula I in association with one or more diluents or adjuvants compatible with the isothiourea derivative(s) and suitable for use in agricultural fungicidal compositions. These compositions can optionally contain other compatible pesticides, such as insecticides or fungicides (e.g., maneb). Preferably the compositions contain between 0.005 and 80 percent by weight of isothiourea derivative.

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the isothiourea derivative with the solid diluent, or by impregnating the solid diluent with a solution of the isothiourea derivative in a volatile solvent, evaporating the solvent, and if necessary grinding the product so as to obtain a powder.

Instead of a solid diluent, there may be used a liquid in which the isothiourea derivative is dissolved or dispersed. The compositions may thus take the form of suspensions, emulsions or solutions in organic or aqueous-organic media, for example aromatic hydrocarbons such as toluene or xylene, mineral, animal or vegetable oils, or acetophenone, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxy groups by condensation with ethylene oxide. If is preferable to use agents of the non-ionic type because they are not sensitive to electrolytes. When emulsions are required, the isothiourea derivatives may be used in the form of self-emulsifying concentrates containing the active substance dissolved in the emulsifying agent or in a solvent containing an emulsifying agent compatible with the isothiourea derivative and solvent, a simple addition of water to such concentrates producing compositions ready for use.

The isothiourea derivatives of general formula I are preferably employed as fungicides in quantities of 5 to 200 g. per hectolitre of, for example, water.

The following Examples 1 and 2 illustrate the preparation of isothiourea derivatives of the invention.

EXAMPLE 1

N-Methylchloroacetamide (3.2g.,), anhydrous potassium carbonate (4.1g.) and potassium iodide (0.1 g.) are added successively to a suspension of 1-methoxycarbonyl-3-(2-acetamidophenyl)-thiourea (8.1g.) in acetone (150 cc.). The resulting suspension is stirred for 3 hours at a temperature of about 20°C and then anhydrous potassium carbonate (0.6 g.) is added and stirring is continued for 3 hours at the same temperature. The precipitate is filtered off and the filtrate is concentrated to dryness under reduced pressure. The oily residue, weighing 12.5 g., it taken up in boiling ethanol(72 cc.). After carrying out a hot filtration in order to remove a small amount of insoluble material, the filtrate is left to cool and the product to crystallise. After filtering off the product and drying, 1-methoxycarbonyl-2-methylcarbamoylmethyl-3-(2-acetamidophenyl)-isothiourea (5 g.), melting at 169°C, is obtained.

1-Methoxycarbonyl-3-(2-acetamidophenyl)-thiourea, which melts at 218°C, can be prepared by reacting 2-acetamidoaniline with methoxycarbonylisothiocyanate.

EXAMPLE 2

By following the same procedure as described in Example I and employing appropriate amide and phenylthiourea starting materials of general formula II and III, the following isothiourea derivatives of general formula I are obtained:

1-methoxycarbonyl-2-methylcarbamoylmethyl-3-(2-benzamidophenyl)-isothiourea, m.p. 168°C.;

1-methoxycarbonyl-2-methylcarbamoylmethyl-3-(2-formamidophenyl)-isothiourea, m.p. 140°C., and 1-methoxycarbonyl-2-t-butylcarbamoylmethyl-3-(2-acetamidophenyl)-isothiourea, m.p. 140°C.

The following Example illustrates fungicidal compositions of the invention.

EXAMPLE 3

A wettable powder containing 50 percent of active material and having the following composition is prepared in accordance with the usual technique:

| | | |
|---|---|---|
| 1-methoxycarbonyl-2-methlycarbamoylmethyl-3-(2-acetamidophenyl)-isothiourea | 50 | g. |
| kieselguhr | 29 | g. |
| polyoxyethylene sorbitan monooleate (non-ionic emulsifying agent) | 1 | g. |
| calcium lignosulphonate. | 20 | g. |

I claim:

1. An isothiourea of the formula:

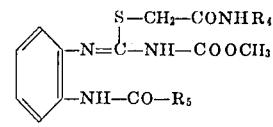

wherein $R_4$ is alkyl of 1 through 4 carbon atoms and $R_5$ is hydrogen, alkyl of 1 through 4 carbon atoms, or phenyl.

2. An isothiourea according to claim 1 wherein $R_4$ represents methyl, and $R_5$ represents hydrogen, methyl or phenyl.

3. The isothiourea according to claim 1 which is 1-methoxycarbonyl-2-methylcarbamoylmethyl-3-(2-acetamidophenyl)-isothiourea.

4. The isothiourea according to claim 1 which is 1-methoxycarbonyl-2-methylcarbamoylmethyl-3-(2-benzamidophenyl)-isothiourea.

5. The isothiourea according to claim 1 which is 1-methoxycarbonyl-2-methylcarbamoylmethyl-3-(2-formamidophenyl)-isothiourea.

6. The isothiourea according to claim 1 which is 1-methoxycarbonyl-2-t-butylcarbamoylmethyl-3-(2-acetamidophenyl)-isothiourea.

* * * * *